(12) United States Patent
Katakawa et al.

(10) Patent No.: US 9,165,340 B2
(45) Date of Patent: Oct. 20, 2015

(54) IMAGE DISPLAY SYSTEM, IMAGE DISPLAY METHOD, IMAGE DISPLAY PROGRAM, AND COMPUTER-READABLE RECORDING MEDIUM STORING SAID PROGRAM

(71) Applicant: Rakuten, Inc., Shinagawa-ku, Tokyo (JP)

(72) Inventors: Jun Katakawa, Shinagawa-ku (JP); Masashi Inoue, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/369,404

(22) PCT Filed: Nov. 2, 2012

(86) PCT No.: PCT/JP2012/078466
§ 371 (c)(1),
(2) Date: Jun. 27, 2014

(87) PCT Pub. No.: WO2013/161104
PCT Pub. Date: Oct. 31, 2013

(65) Prior Publication Data
US 2014/0375648 A1    Dec. 25, 2014

(30) Foreign Application Priority Data
Apr. 27, 2012    (JP) .................. 2012-102988

(51) Int. Cl.
*G06T 15/10*    (2011.01)
*G06T 15/20*    (2011.01)
(Continued)

(52) U.S. Cl.
CPC ... *G06T 3/40* (2013.01); *G06T 1/20* (2013.01); *G06T 2207/20021* (2013.01)

(58) Field of Classification Search
CPC . G06T 1/00; G06T 2219/2016; G06T 3/4084; G06F 3/048; G06F 2203/04806; G09G 5/00; G09G 5/42; G06K 9/4671
USPC .......................................... 345/619
See application file for complete search history.

(56) References Cited

U.S. PATENT DOCUMENTS

| 2011/0058191 A1 | 3/2011 | Tokumoto |
| 2012/0206491 A1 | 8/2012 | Kawai et al. |

FOREIGN PATENT DOCUMENTS

| EP | 0 933 694 A1 | 8/1999 |
| JP | 11-088866 A | 3/1999 |

(Continued)

OTHER PUBLICATIONS

JP 2008217256 A, English Translation.*

(Continued)

*Primary Examiner* — Kee M Tung
*Assistant Examiner* — Yuehan Wang
(74) *Attorney, Agent, or Firm* — Sughrue Mion, PLLC

(57) ABSTRACT

The image display system includes a calculation unit, a specifying unit, a generation unit and a transmitting unit. Upon change of a zoom level of a current image not containing position information to a specified value on a user terminal, the calculation unit calculates a display range of an object represented by the current image after change in zoom level. The specifying unit refers to data of a different image of the object and specifies a part of the different image indicated by the display range calculated by the calculation unit. The different image has a different resolution from the current image. The generation unit generates a next image representing the part specified by the specifying unit using the data of the different image. The transmitting unit transmits the next image to the user terminal for switching from the current image to the next image.

13 Claims, 13 Drawing Sheets

(51) Int. Cl.
*G06T 3/40* (2006.01)
*G06T 1/20* (2006.01)

(56) References Cited

FOREIGN PATENT DOCUMENTS

| JP | 2003-099357 A | | 4/2003 |
|---|---|---|---|
| JP | 2008-217256 A | | 9/2008 |
| JP | 2008217256 A | * | 9/2008 |
| JP | 2011-061555 A | | 3/2011 |
| JP | 2011-210013 A | | 10/2011 |
| JP | 2011210013 A | * | 10/2011 |
| WO | 2008/126739 A1 | | 10/2008 |
| WO | 2011/030484 A1 | | 3/2011 |

OTHER PUBLICATIONS

JP 2011210013 A, English Translation.*
Google Inc. "Google Map" [online] Internet <URL: http://maps.google.co.jp/>.
Office Action issued in JP2012-102988 dated Jul. 16, 2013.
International Search Report for PCT/JP2012/078466 dated Nov. 27, 2012.
International Search Report for PCT/JP2012/078466 dated Nov. 6, 2014.

* cited by examiner

Fig.6
(a)
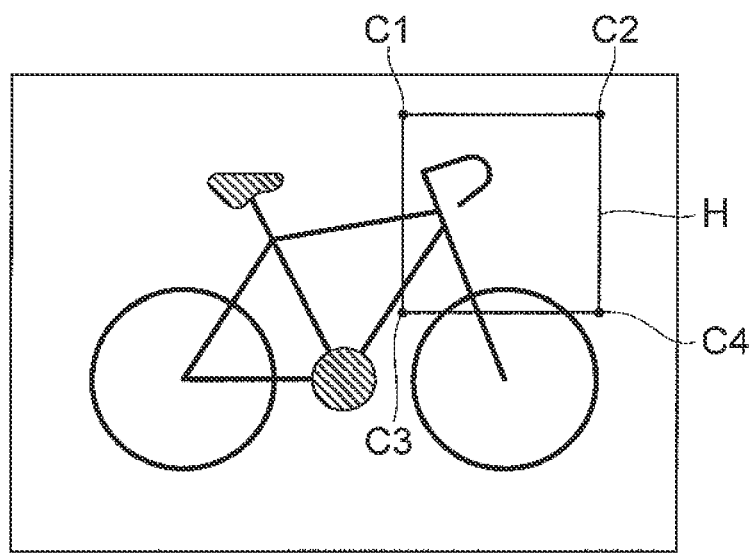
(b)
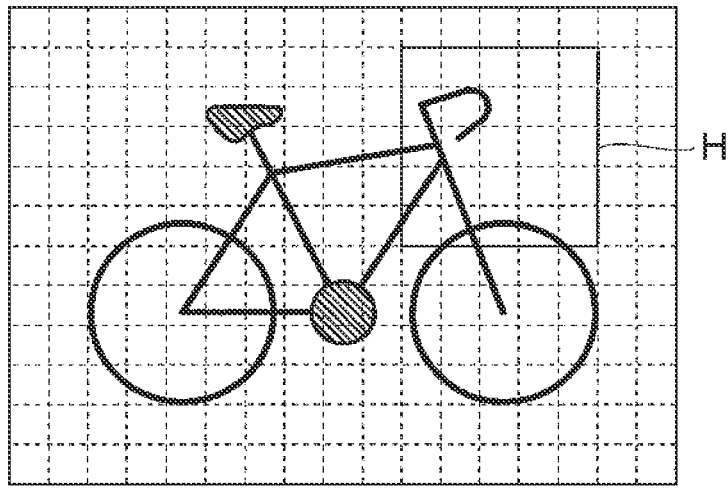

Fig.11
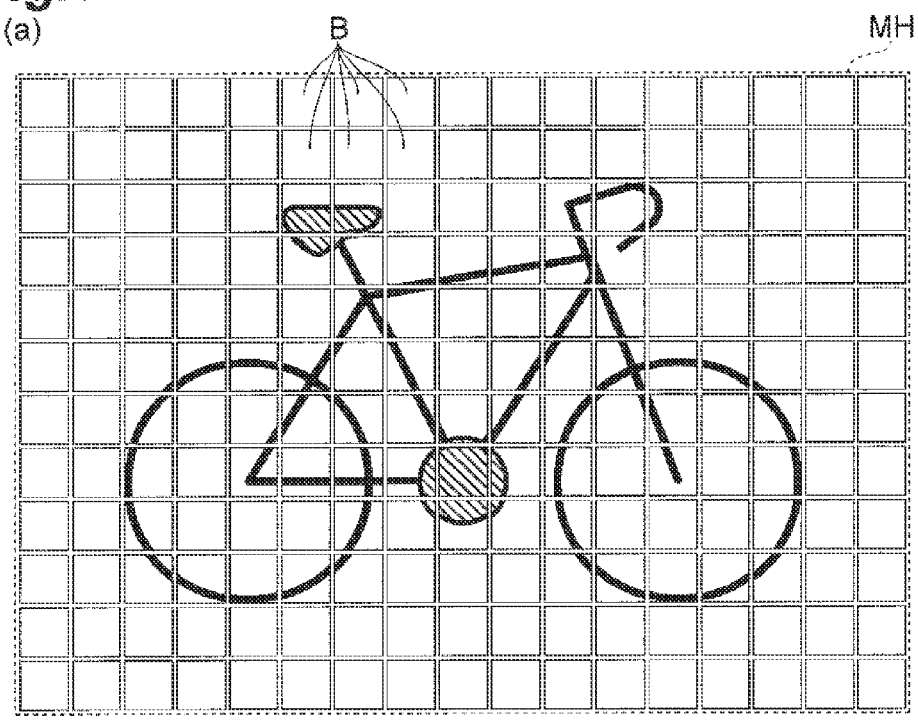
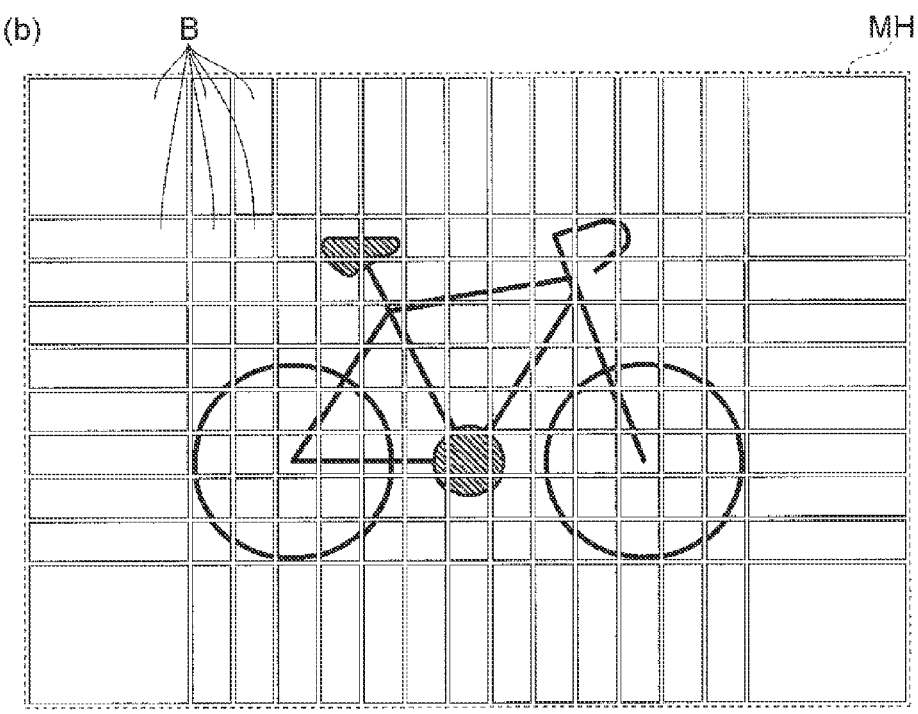

IMAGE DISPLAY SYSTEM, IMAGE DISPLAY METHOD, IMAGE DISPLAY PROGRAM, AND COMPUTER-READABLE RECORDING MEDIUM STORING SAID PROGRAM

CROSS REFERENCE TO RELATED APPLICATIONS

This application is a National Stage of International Application No. PCT/JP2012/078466 filed Nov. 2, 2012, claiming priority based on Japanese Patent Application No. 2012-102988 filed Apr. 27, 2012, the contents of all of which are incorporated herein by reference in their entirety.

TECHNICAL FIELD

One embodiment of the present invention relates to an image display system, an image display method, an image display program, and a computer-readable recording medium storing the program for replotting an image in accordance with a change in zoom level.

BACKGROUND ART

Techniques to change the zoom level of an image displayed on a computer in response to a user operation are known. For example, in the website disclosed in the following Non Patent Literature 1, when the zoom-in ratio or the zoom-out ratio of a map reaches a specified value by an operation such as pinch-out or pinch-in on a touch panel, the screen changes to the layer of a more detailed map or a wider area map.

CITATION LIST

Non Patent Literature

NPL 1: Google Inc. "Google Map" [online] Internet <URL: http://maps.google.co.jp/>

SUMMARY OF INVENTION

Technical Problem

In the above website, positioning of the upper layer and the lower layer is achieved based on the latitude and the longitude embedded in the image. Accordingly, in order to achieve switching of images in response to a change in zoom level, it is necessary to embed position information into the image in advance. Therefore, an object of one aspect of the present invention is to achieve positioning of images before and after change in zoom level even in the case of using an image with no position information.

Solution to Problem

An image display system according to one aspect of the present invention includes a calculation unit configured to, in response to change of a zoom level of a current image not containing position information to a specified value on a user terminal, calculate a display range of an object represented by the current image after change in zoom level, a specifying unit configured to refer to data of a different image of the object stored in a storage unit and specify a part of the different image indicated by the display range calculated by the calculation unit, the different image having a different resolution from the current image, a generation unit configured to generate a next image representing the part specified by the specifying unit using the data of the different image, and a transmitting unit configured to transmit the next image to the user terminal for switching from the current image to the next image.

An image display method according to one aspect of the present invention is an image display method executed in an image display system, the method including a calculation step of, in response to change of a zoom level of a current image not containing position information to a specified value on a user terminal, calculating a display range of an object represented by the current image after change in zoom level, a specifying step of referring to data of a different image of the object stored in a storage unit and specifying a part of the different image indicated by the display range calculated in the calculation step, the different image having a different resolution from the current image, a generation step of generating a next image representing the part specified in the specifying step using the data of the different image, and a transmitting step of transmitting the next image to the user terminal for switching from the current image to the next image.

An image display program according to one aspect of the present invention causes a computer to implement a calculation unit configured to, in response to change of a zoom level of a current image not containing position information to a specified value on a user terminal, calculate a display range of an object represented by the current image after change in zoom level, a specifying unit configured to refer to data of a different image of the object stored in a storage unit and specify a part of the different image indicated by the display range calculated by the calculation unit, the different image having a different resolution from the current image, a generation unit configured to generate a next image representing the part specified by the specifying unit using the data of the different image, and a transmitting unit configured to transmit the next image to the user terminal for switching from the current image to the next image.

A computer-readable recording medium according to one aspect of the present invention stores an image display program that causes a computer to implement a calculation unit configured to, in response to change of a zoom level of a current image not containing position information to a specified value on a user terminal, calculate a display range of an object represented by the current image after change in zoom level, a specifying unit configured to refer to data of a different image of the object stored in a storage unit and specify a part of the different image indicated by the display range calculated by the calculation unit, the different image having a different resolution from the current image, a generation unit configured to generate a next image representing the part specified by the specifying unit using the data of the different image, and a transmitting unit configured to transmit the next image to the user terminal for switching from the current image to the next image.

According to the above aspects, when the zoom level of the current image changes to a specified value, the display range of the object represented by the current image after change is calculated, and a part of a different image required for generation of the next image is specified. Then, the next image is generated from the different image with a different resolution from the current image and transmitted to the user terminal, and thereby switching from the current image to the next image is done. In this manner, even when the current image does not have the position information, it is possible to achieve positioning of the current image and the next image (positioning of the images before and after change in zoom level) by calculating the display range after change in zoom level and specifying a part of the different image indicated by the display range.

In an image display system according to another aspect of the present invention, the specifying unit may specify one or more blocks corresponding to the calculated display range from the different image divided into a plurality of mesh-like blocks as a part of the different image. With use of the different image divided in this manner, it is possible to easily specify a part of the different image necessary for the next image.

In an image display system according to another aspect of the present invention, the plurality of blocks may be formed by equally dividing a whole of the different image. In this case, the different image can be easily divided into a plurality of blocks, and it is thereby possible to reduce the operating time required for processing.

In an image display system according to another aspect of the present invention, the plurality of blocks may be formed by equally dividing a rectangular region circumscribing the object. In this manner, by dividing only the object into a plurality of blocks and generating the next image using the blocks only, it is possible to minimize the load of image processing.

In an image display system according to another aspect of the present invention, the plurality of blocks may be formed by equally dividing the rectangular region and dividing an outside of the rectangular region. By dividing the outside of the object also into blocks, the whole of the next image to be displayed can be generated when near the edge of the rectangular region is zoomed in. In other words, it is possible to deal with zooming in near the edge of the object.

In an image display system according to another aspect of the present invention, the specifying unit may divide the different image into the plurality of mesh-like blocks each time the display range is calculated by the calculation unit. In this case, there is no need to previously include information about the blocks into the data of the different image, and it is thereby possible to prepare the data of the different image easily.

In an image display system according to another aspect of the present invention, block information identifying the plurality of blocks may be contained in advance in the data of the different image, and the specifying unit may specify a part of the different image by referring to the block information. In this case, the specifying unit can skip the processing of dividing the different image into a plurality of blocks, and it is thereby possible to specify a part necessary for generation of the next image in a shorter time.

In an image display system according to another aspect of the present invention, the data of the different image may be a set of data of the individual blocks, and the generation unit may generate the next image by joining the blocks corresponding to the specified part. In this case, the specifying unit can skip the processing of dividing the different image into a plurality of blocks each time processing is carried out, and it is thereby possible to specify a part necessary for generation of the next image in a shorter time.

In an image display system according to another aspect of the present invention, the calculation unit may specify a center point of change of the zoom level and calculate the display range based on the center point and the zoom level. By specifying the center in this manner, it is possible to calculate the display range accurately.

In an image display system according to another aspect of the present invention, when the zoom level of the current image reaches another reference value corresponding to the specified value before reaching the specified value, the calculation unit may start calculating the display range of a case where the zoom level of the current image reaches the specified value, and when the zoom level of the current image reaches the specified value without going through said another reference value, the calculation unit may calculate the display range of the object represented by the current image after change in zoom level in response to change of the zoom level to the specified value. In this manner, by starting the calculation of the display range indicated by a specified value before the zoom level of the current image reaches the specified value, the next image is transmitted to the user terminal earlier. As a result, it is possible to perform switching of images in a more seamless manner. Further, because the display range after change is calculated also when the zoom level changes to the specified value without going through another reference value, it is possible to transmit the next image to the user terminal.

In an image display system according to another aspect of the present invention, the image display system may include a server configured to communicate with the user terminal, the user terminal may include the calculation unit, the server may include the specifying unit, the generation unit and the transmitting unit, and the calculation unit may transmit range information indicating the display range to the server. In this case, the server does not need to calculate the display range, and it is therefore possible to reduce the processing in the server. Further, because the request from the user terminal is transmitted to the server only after an operation to change the zoom level of the current image to a specified value is performed, it is possible to reduce the communication load.

In an image display system according to another aspect of the present invention, the image display system may include a server configured to communicate with the user terminal, the user terminal may provide operation information indicating a user operation related to change in zoom level to the server, the server may include the calculation unit, the specifying unit, the generation unit and the transmitting unit, and the calculation unit may calculate the display range based on the operation information. In this case, the user terminal does not need to calculate the display range, and it is therefore possible to reduce the processing in the user terminal.

Advantageous Effects of Invention

According to one aspect of the present invention, it is possible to achieve positioning of images before and after change in zoom level even in the case of using an image with no position information.

BRIEF DESCRIPTION OF DRAWINGS

FIG. 6(*a*) is a diagram showing an example in which a display range is represented by coordinates, and FIG. 6(*b*) is a diagram showing an example in which a display range is represented by blocks.

FIGS. 11(a) and 11(b) are diagrams showing examples of storing different image data divided into a plurality of blocks in advance.

DESCRIPTION OF EMBODIMENTS

Figure 1:
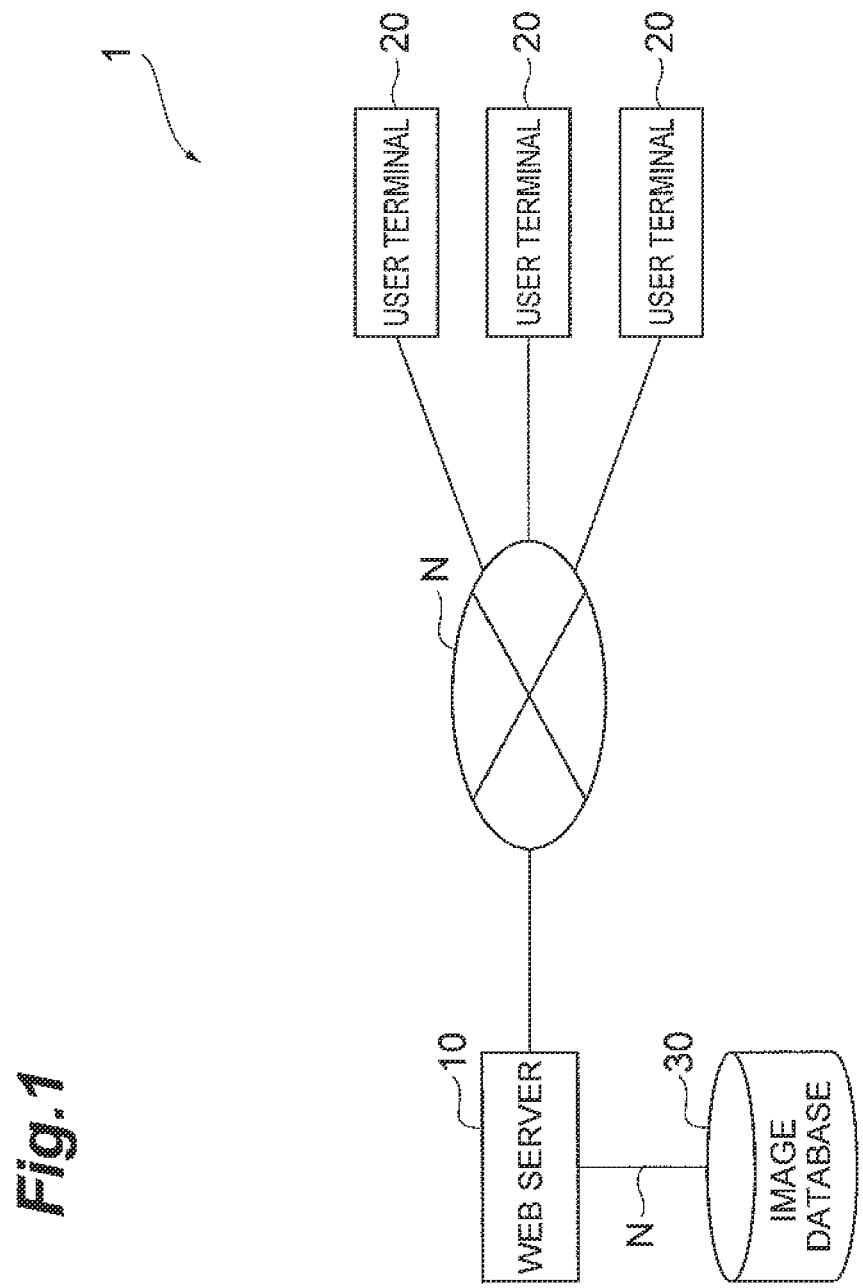
FIG. 1 is a diagram showing an overall configuration of an image display system according to an embodiment.

An embodiment of the present invention is described hereinafter in detail with reference to the appended drawings. Note that, in the description of the drawings, the same or equivalent elements are denoted by the same reference symbols, and the redundant explanation thereof is omitted.

First, the functions and configuration of an image display system 1 according to an embodiment are described hereinafter with reference to FIGS. 1 to 10. The image display system 1 is a computer system that provides contents containing images to a user. In this embodiment, the image display system 1 provides a webpage containing an image to a user. The image display system 1 includes a web server 10, user terminals 20, and an image database (storage unit) 30. Those devices are connected with one another through a communication network N including the Internet, an intranet and the like. A user can access a website (a website provided by the web server 10) by operating the user terminal 20 and thereby obtains information.

The web server 10 is a computer that generates a webpage in response to a request from the user terminal 20 and transmits the webpage as a response to the user terminal 20. In this embodiment, the webpage contains an image on which a zoom in or out operation can be made. Note that, however, the variety of the content and the image of the webpage are not particularly limited. For example, the webpage may be a page of an online shopping site or an Internet auction site, or a page of a map site. The image may be an item image or a map image.

The user terminal 20 is a computer owned by a user. The variety of the user terminal 20 is not particularly limited, and it may be a stationary or portable personal computer, or a mobile terminal such as an advanced mobile phone (smart phone), a cellular phone or a personal digital assistant (PDA), for example. The number of user terminals 20 in the image display system 1 is not limited.

The image database 30 is a device that stores images to be displayed on a webpage provided to the user terminal 20. Specifically, the image database 30 stores image data with a plurality of different resolutions for each image (for example, a photograph, illustration and the like).

Figure 2:
FIG. 2 is a diagram showing an example of image information stored in an image database shown in FIG. 1.

A plurality of image data for one image are stored in the image database 30 as image information. As shown in FIG. 2, each record of the image information contains an image ID that identifies the image, image data of a low-resolution image (low-resolution data), and image data of a high-resolution image (high-resolution data). To simplify the description below, an image name is used instead of the image ID according to need. Specifically, in the example of FIG. 2, the image identified by the image ID "0001" is also referred to as "image A", and the image identified by the image ID "0002" is also referred to as "image B". Note that, the image data is schematically shown in FIG. 2. If the resolution of the low-resolution image is RL and the resolution of the high-resolution image is RH, RL<RH as a matter of course.

For one certain image, the low-resolution data and the high-resolution data are distinguished from each other by sub ID. Thus, one certain image is identified by the combination of an image ID and a sub ID. For example, the low-resolution data of the image A is uniquely identified by the combination of the image ID "0001" and the sub ID "1", and the high-resolution data of the image B is uniquely identified by the combination of the image ID "0002" and the sub ID "2". Note that, however, an identifier with a structure different from the combination of an image ID and a sub ID may be used as long as every single high-resolution data and low-resolution data can be uniquely identified.

Note that the structures of the image database 30 and the image information are not limited to those shown in FIG. 2, and they may be normalized or made redundant by an arbitrary policy.

In the image display system 1, the web server 10 transmits a webpage containing an image to the user terminal 20 in response to a request from the user terminal 20, and the user terminal 20 displays the image. A user can zoom in or out the image using the user terminal 20. Note that an operation method for zooming in or out the image is not particularly limited. For example, the user may change the zoom level by pinch-in or pinch-out or may change the zoom level using a scale or a slider for zooming which are displayed on the screen.

When the zoom-in ratio or the zoom-out ratio of the image becomes a specified threshold or higher, the user terminal 20 requests a new image to the web server 10, and, in response to the request, the web server 10 generates a next image with a different resolution and transmits it to the user terminal 20. As a result, the zoomed in or out image is displayed with the resolution suitable for display after the user operation.

Figure 3:
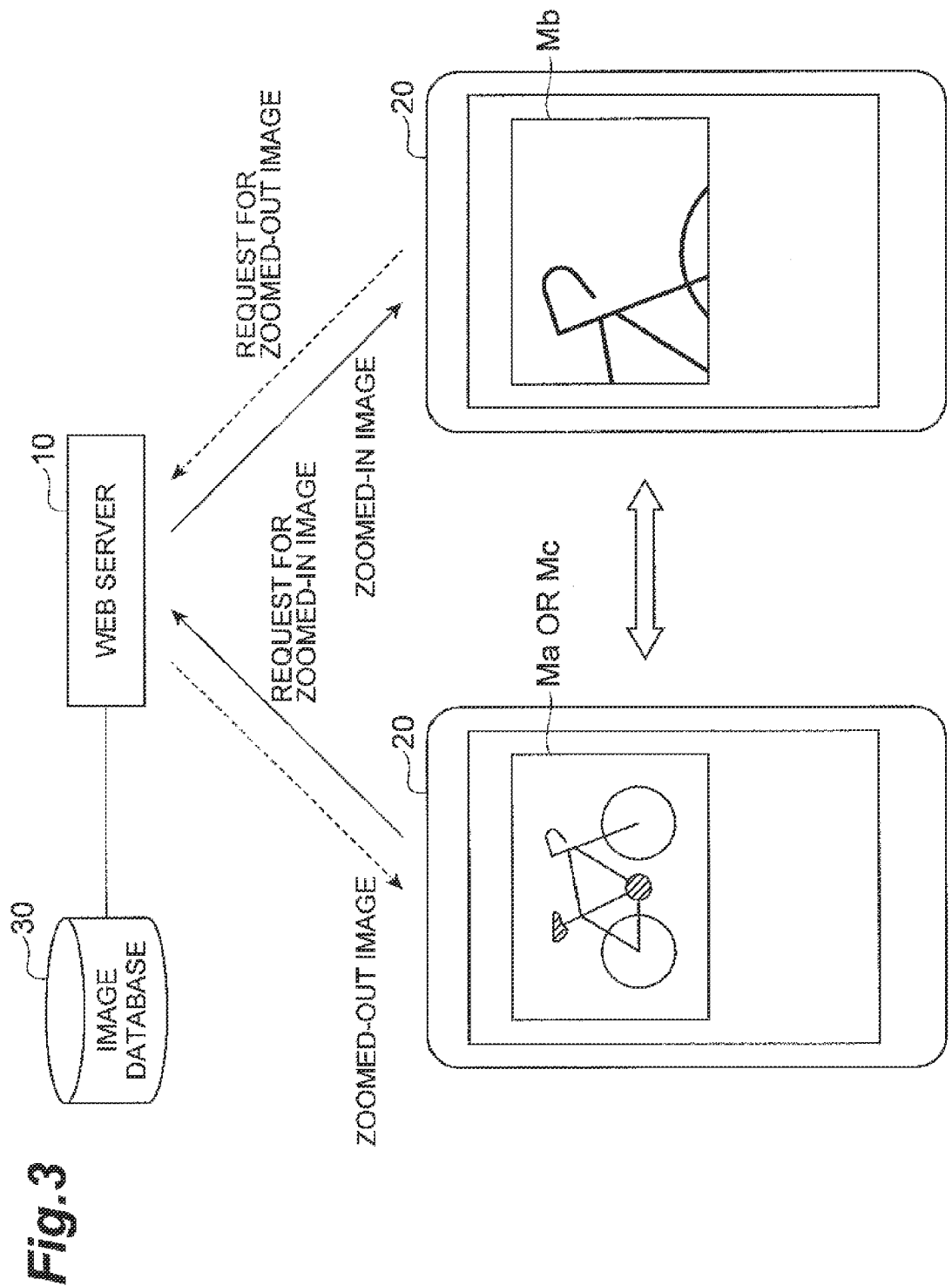
FIG. 3 is a diagram showing a concept of image processing according to an embodiment.

The outline of the above process is described hereinafter specifically with reference to FIG. 3. When a user performs a pinch-out operation on an initial image Ma showing the overall picture of a bicycle (object) and the zoom level of the image Ma becomes a specified threshold or higher, the user terminal 20 requests a zoomed-in image (an image showing a part of the bicycle) to the web server 10. In response to the request, the web server 10 reads image data with a different resolution from the initial image (image data with a resolution suitable for zoom-in) from the image database 30, generates a zoomed-in image using the data and transmits the zoomed-in image to the user terminal 20. A zoomed-in image Mb is thereby displayed on the user terminal 20.

After that, when a user performs a pinch-in operation on the zoomed-in image Mb and the zoom level of the image Mb falls below the specified threshold, the user terminal 20 requests a zoomed-out image to the web server 10. In response to the request, the web server 10 reads image data with a different resolution from the zoomed-in image Mb (image data with a resolution suitable for zoom-out) from the image database 30, generates a zoomed-out image using the data and transmits the zoomed-out image to the user terminal 20. A zoomed-out image Mc is thereby displayed on the user terminal 20. Note that the zoomed-out image Mc may be an image of the whole bicycle (which is the same as the initial image Ma) or an image of a part of the bicycle.

Figure 4:
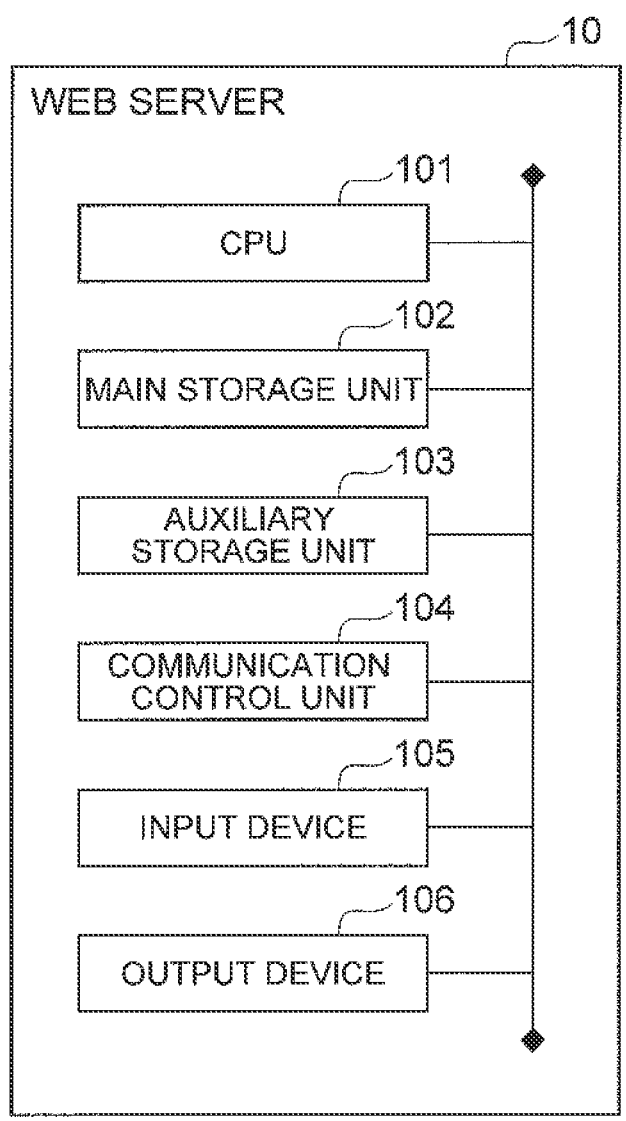
FIG. 4 is a diagram showing a hardware configuration of a web server shown in FIG. 1.

FIG. 4 shows a hardware configuration of the web server 10 that executes the above processing. As shown therein, the web server 10 includes a CPU 101 that executes an operating system, an application program and the like, a main storage unit 102 such as ROM and RAM, an auxiliary storage unit 103 such as a hard disk, a communication control unit 104 such as a network card, an input device 105 such as a keyboard and a mouse, and an output device 106 such as a display.

The functional components of the web server 10, which are described later, are implemented by loading given software onto the CPU 101 or the main storage unit 102, making the communication control unit 104, the input unit 105, the output unit 106 and the like operate under control of the CPU 101, and performing reading and writing of data in the main storage unit 102 or the auxiliary storage unit 103. The data and database required for processing are stored in the main storage unit 102 or the auxiliary storage unit 103. Note that, although the web server 10 is composed of one computer in the example of FIG. 4, the functions of the web server 10 may be distributed among a plurality of computers.

The user terminal 20 has the same hardware configuration as the web server 10 and therefore the illustration of the hardware configuration of the user terminal 20 is omitted. Note that, however, specific parts can be different between the user terminal 20 and the web server 10, and the input device and the output device are implemented by a touch panel in the user terminal 20, for example. In the user terminal 20, like the web server 10, the below-described functional components are implemented using hardware.

Figure 5:
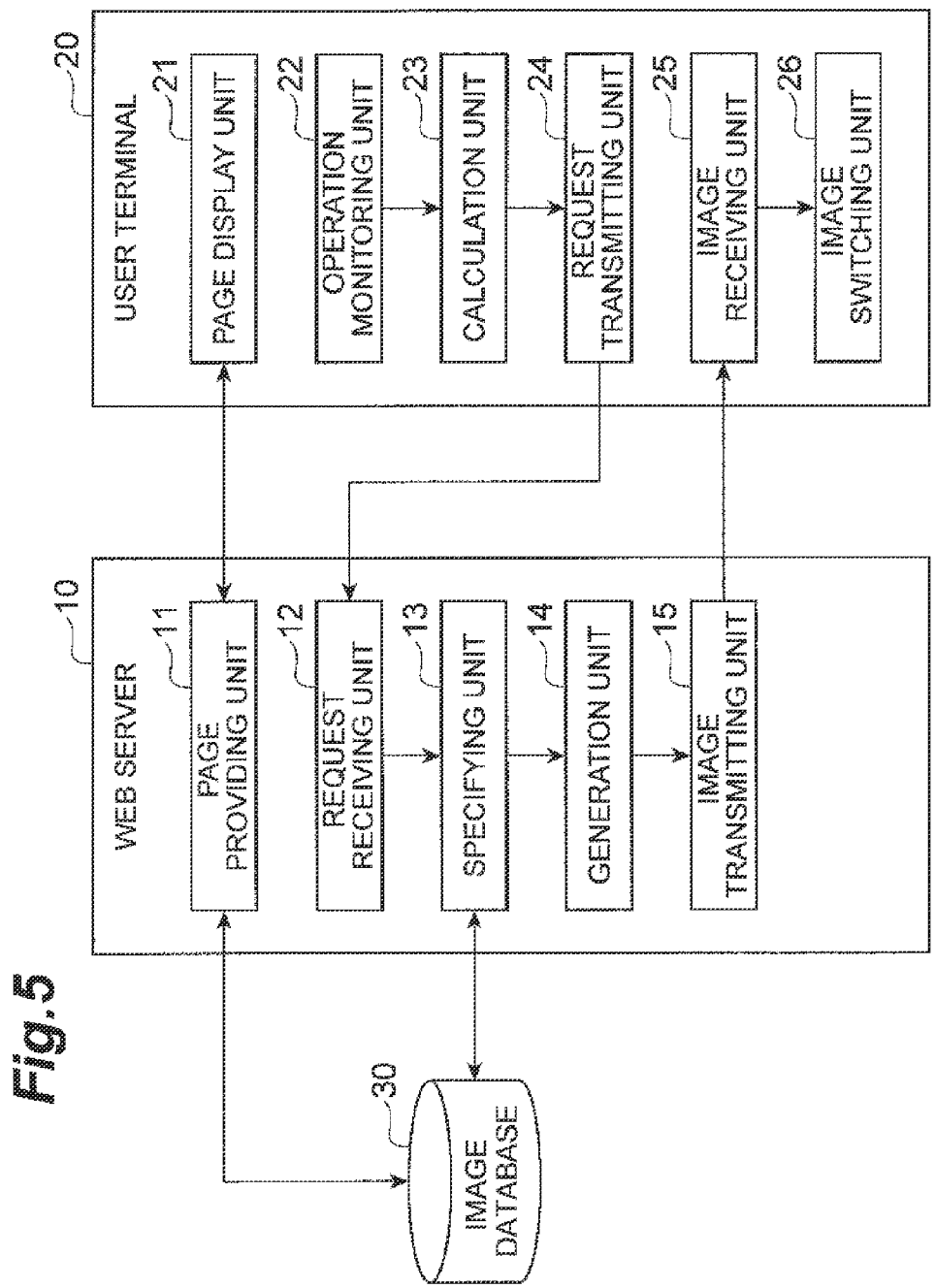
FIG. 5 is a block diagram showing functions of the web server and a user terminal shown in FIG. 1.

As shown in FIG. 5, the web server 10 includes, as functional components, a page providing unit 11, a request receiving unit 12, a specifying unit 13, a generation unit 14, and an image transmitting unit 15. The user terminal 20 includes, as functional components, a page display unit 21, an operation monitoring unit 22, a calculation unit 23, a request transmitting unit 24, an image receiving unit 25, and an image switching unit 26.

The functions of the user terminal 20 are described first. The page display unit 21 is a functional element that acquires a webpage containing an image from the web server 10 and displays the webpage on its screen. When a user performs an operation of specifying a certain website, the page display unit 21 transmits a page request containing the URL (Uniform Resource Locator) of the website to the web server 10. After that, the page display unit 21 receives a webpage transmitted from the web server 10 in response to the HTTP (Hypertext Transfer Protocol) request and displays the webpage on the screen. Further, the page display unit 21 receives image data to be embedded in the webpage from the web server 10 and displays it. In the image data, an image ID and a sub ID for identifying the image are embedded. As a result, the webpage containing the image is displayed on the screen of the user terminal 20. In this embodiment, it is assumed that the low-resolution image is displayed on the webpage at the point of time when the webpage is displayed first.

The operation monitoring unit 22 is a functional element that monitors operations on an image (current image) in the currently displayed webpage. Particularly, during the period from the start to the end of an operation that continuously changes the zoom level of the current image, the operation monitoring unit 22 acquires operation information indicating that operation at a specified time interval. In the case of capturing pinch-in or pinch-out, the operation monitoring unit 22 acquires the positions of two fingers touching the touch panel, a change in the distance between the two touch positions and the like and outputs a result of the acquisition as operation information to the calculation unit 23. In the case of capturing an operation by a scale or a slider for zooming by a pointing device such as a mouse, the operation monitoring unit 22 outputs the amount of change in the interface and the center point of the image in the display area as the operation information to the calculation unit 23. Note that a method of capturing operations is not limited to those.

The calculation unit 23 is a functional element that calculates the display range of an object represented by the current image after change in zoom level in response to an operation that changes the zoom level of the current image to a specified value. First, the calculation unit 23 acquires or calculates the zoom level of the current image based on the operation information. The calculation unit 23 may directly acquire the zoom level by the API (Application Programming Interface) incorporated in the user terminal 20 or the script incorporated in the webpage. Alternatively, the calculation unit 23 may obtain the zoom level by calculating the ratio of the distance between the two touch positions by pinch-in or pinch-out and the size of the whole screen or the screen display area. Alternatively, the calculation unit 23 may obtain the zoom level from the amount of change of the scale or the slider.

Then, the calculation unit 23 determines whether the obtained zoom level reaches a specified threshold. The threshold may be set arbitrarily. For example, if the zoom level at the initial display is 1.0 and the zoom level is managed as an absolute value, the threshold may be 1.5(×), 2.0(×), or another value. Alternatively, if the zoom level at the initial display and immediately after switching is 1.0 and the zoom level is managed as a relative value, the threshold for zooming in may be set to 1.5(×), 2.0(×) or the like, and the threshold for zooming out may be set to 0.5(×), 0.7(×) or the like.

When the obtained zoom level does not reach the threshold, the calculation unit 23 ends the process and, in this case, the current image is zoomed in or displayed as it is according to a user operation without any change to the resolution.

On the other hand, when the obtained zoom level reaches the threshold, the calculation unit 23 calculates the display range of the object represented by the current image after change in zoom level. The calculation unit 23 may obtain the display range at the current time while the user continues the operation or may obtain the display range at the time when the user stops the operation.

The calculation unit 23 may calculate the boundary of the display range based on the ratio of the distance between the two current touch positions or touch end positions and the size of the whole screen or the image display area where the midpoint of the two touch start positions by pinch-in or pinch-out is the center of the display range. Alternatively, the calculation unit 23 may calculate the boundary of the display range based on the amount of change or a value after change of the scale or the slider where the center point of the image in the display area is the center of the display range. By specifying the center in this manner, it is possible to calculate the display range accurately. Note that, however, a method of calculating the display range is not limited thereto. The calculation unit 23 outputs range information indicating the calculated display range to the request transmitting unit 24.

The way of representing the range information is not limited. For example, as shown in FIG. 6(*a*), the calculation unit 23 may output a plurality of coordinates (coordinates C1 to C4 in FIG. 6(*a*)) required for determining the display range H after change in zoom level as the range information. Alternatively, as shown in FIG. 6(*b*), the calculation unit 23 may divide the current image into meshes and output a set of addresses of blocks (block information) constituting the display range H (which is a set of 25 identifiers in the example of FIG. 6(*b*)) as the range information. In any case, because any position information is not contained in the current image, the calculation unit 23 needs to obtain the display range H by calculation.

The request transmitting unit 24 is a functional element that requests a next image with a resolution different from the current image to the web server 10. The request transmitting unit 24 transmits a next image request containing range information indicating the display range, the image ID and the sub ID of the image on which the operation is performed, and operation type information indicating zooming in or zooming out to the web server 10.

The image receiving unit 25 is a functional element that receives the next image transmitted from the web server 10 in response to the next image request. The image receiving unit 25 outputs the next image to the image switching unit 26.

The image switching unit 26 is a functional element that switches the current image displayed on the screen to the next image. To be specific, the image switching unit 26 overwrites the current image with the next image by setting data of the next image in the display area of the current image.

The functions of the web server 10 are described hereinbelow. The page providing unit 11 is a functional element that generates a webpage and provides it to the user terminal 20. Receiving a page request from the user terminal 20, the page providing unit 11 generates a webpage with the URL indicated by the request and transmits data of the webpage to the user terminal 20. Further, the page providing unit 11 reads low-resolution data indicated by the URL of the image described in the webpage from the image database 30 and transmits the image data as an initial image to the user terminal 20. In the image data, an image ID and a sun ID for identifying the image are embedded. No any position information (for example, position information indicating the position of the image or the object) is embedded in the image data, The request receiving unit 12 is a functional element that receives a next image request from the user terminal 20. The request receiving unit 12 outputs the request to the specifying unit 13.

The specifying unit 13 is a functional element that refers to data of a different image (different image data) of the object stored in the image database 30 and specifies a part of the different image indicated by the display range of the next image request. The different image data is data of the image with a different resolution from the current image that is currently displayed on the user terminal 20.

The specifying unit 13 identifies the image data of the current image based on the image ID and the sub ID indicated by the next image request and reads image data to be used as the next image from the image database 30 based on a result of the identification and operation type information indicated by the next image request. For example, when the sub ID is "1" and the operation type information indicates "zoom-in", the specifying unit 13 reads the high-resolution data having the same image ID and the sub ID "2". When the sub ID is "2" and the operation type information indicates "zoom-out", the specifying unit 13 reads the low-resolution data having the same image ID and the sub ID "1".

Then, the specifying unit 13 compares the different image indicated by the read image data with the display range indicated by the range information of the next image request and thereby specifies a part of the different image indicated by the display range. The specifying unit 13 can specify the range to be displayed next by using various methods.

Figure 7:
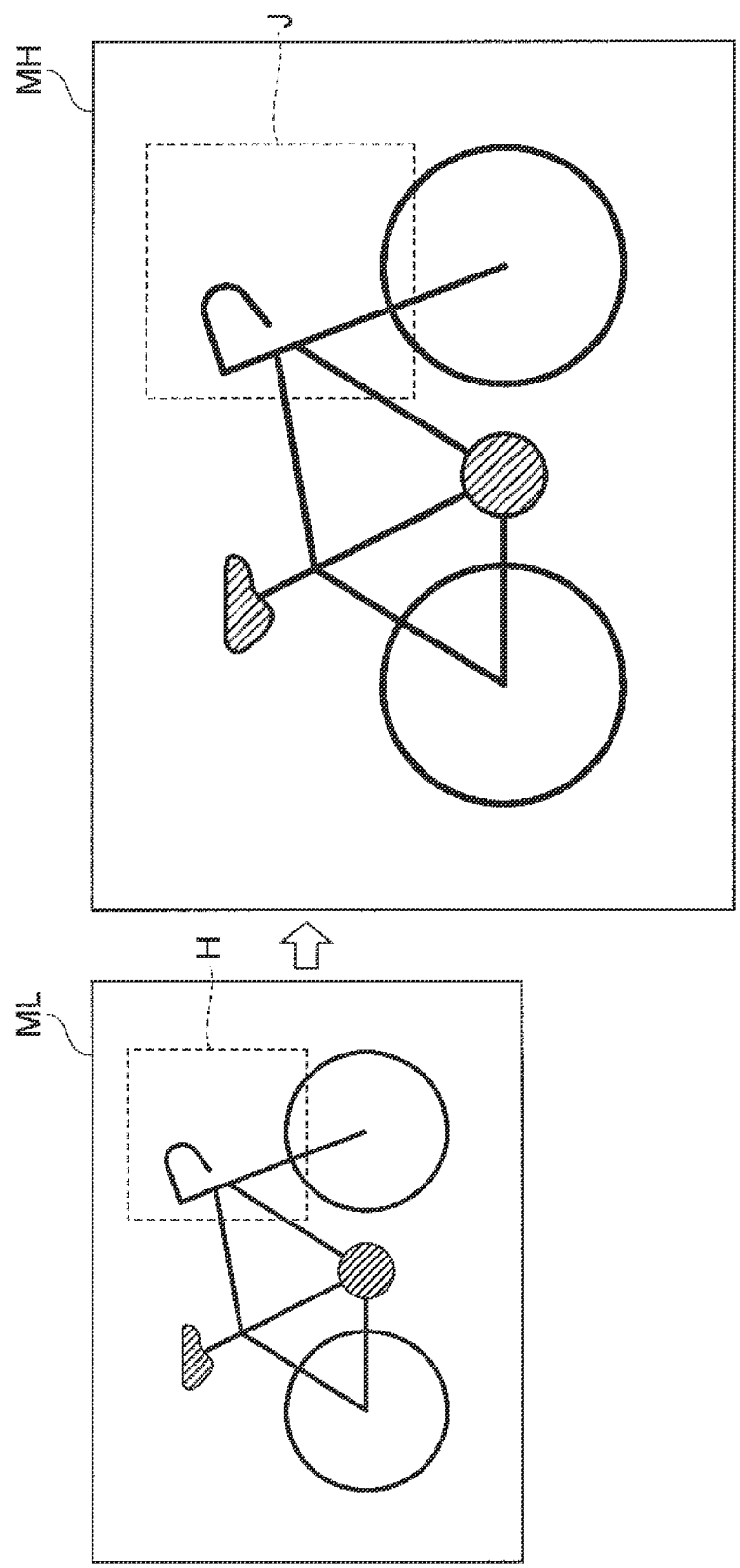
FIG. 7 is a diagram showing an example of specifying a part of a different image.
Figure 8:
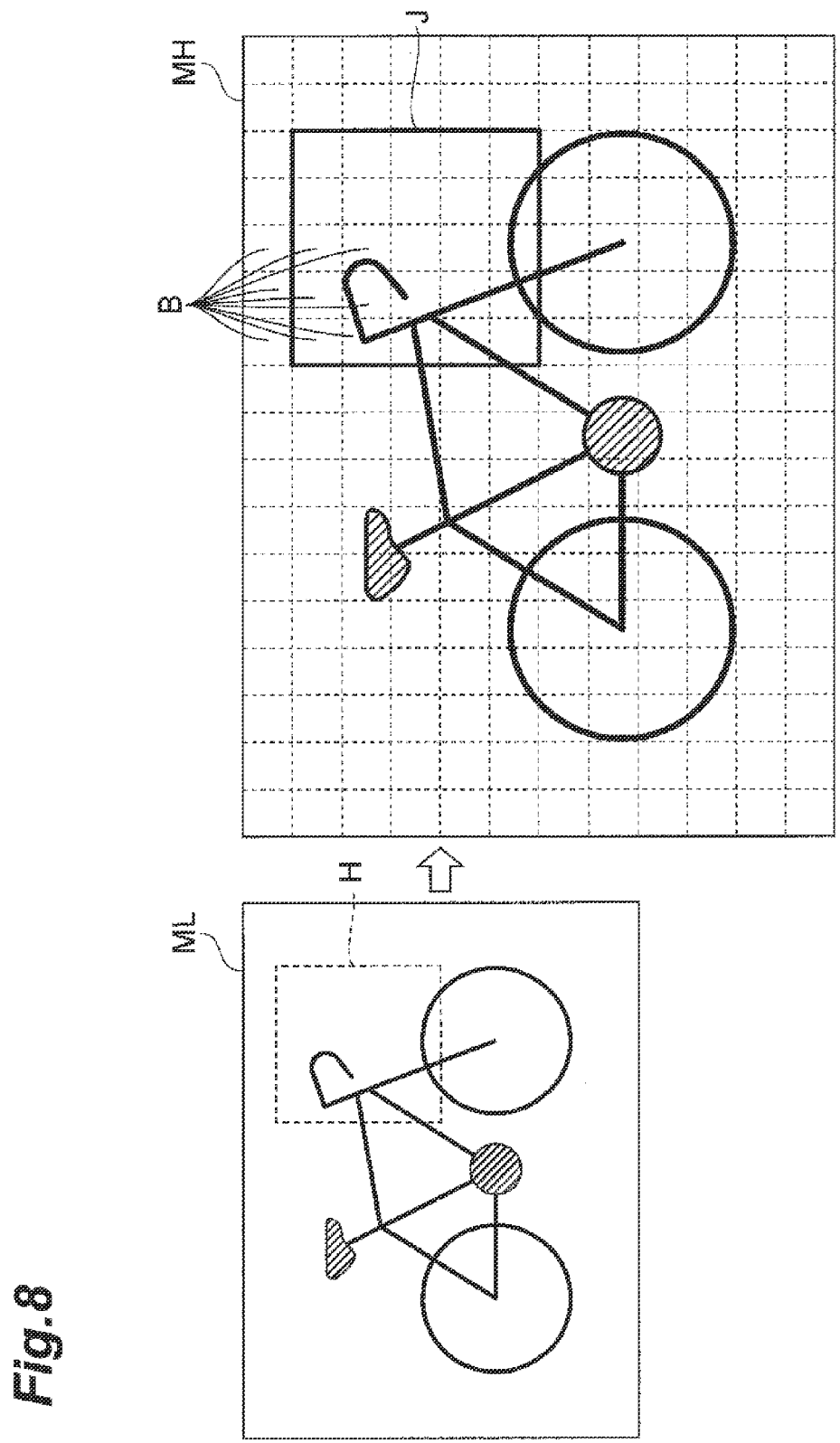
FIG. 8 is a diagram showing another example of specifying a part of a different image.

In the case where the low-resolution image and the high-resolution image indicated by the same image ID are similar to each other, the specifying unit 13 specifies a part of the different image indicated by the display range of the range information based on the scale between those two images. For example, as shown in FIG. 7, the specifying unit 13 may specify a part J of the high-resolution image (different image) MH corresponding to the display range H of the low-resolution image (current image) ML using coordinates. Alternatively, as shown in FIG. 8, the specifying unit 13 may specify a set of one or more blocks B corresponding to the display range H as a part J of the different image MH using meshes that equally divide the different image. In this case, the different image can be easily divided into a plurality of blocks, and it is thereby possible to reduce the operating time required for processing. If the range information is a set of addresses of blocks (block information) and the meshes are similar between the two images, the specifying unit 13 can specify a part J of the different image MH using the addresses indicated by the range information.

Figure 9:
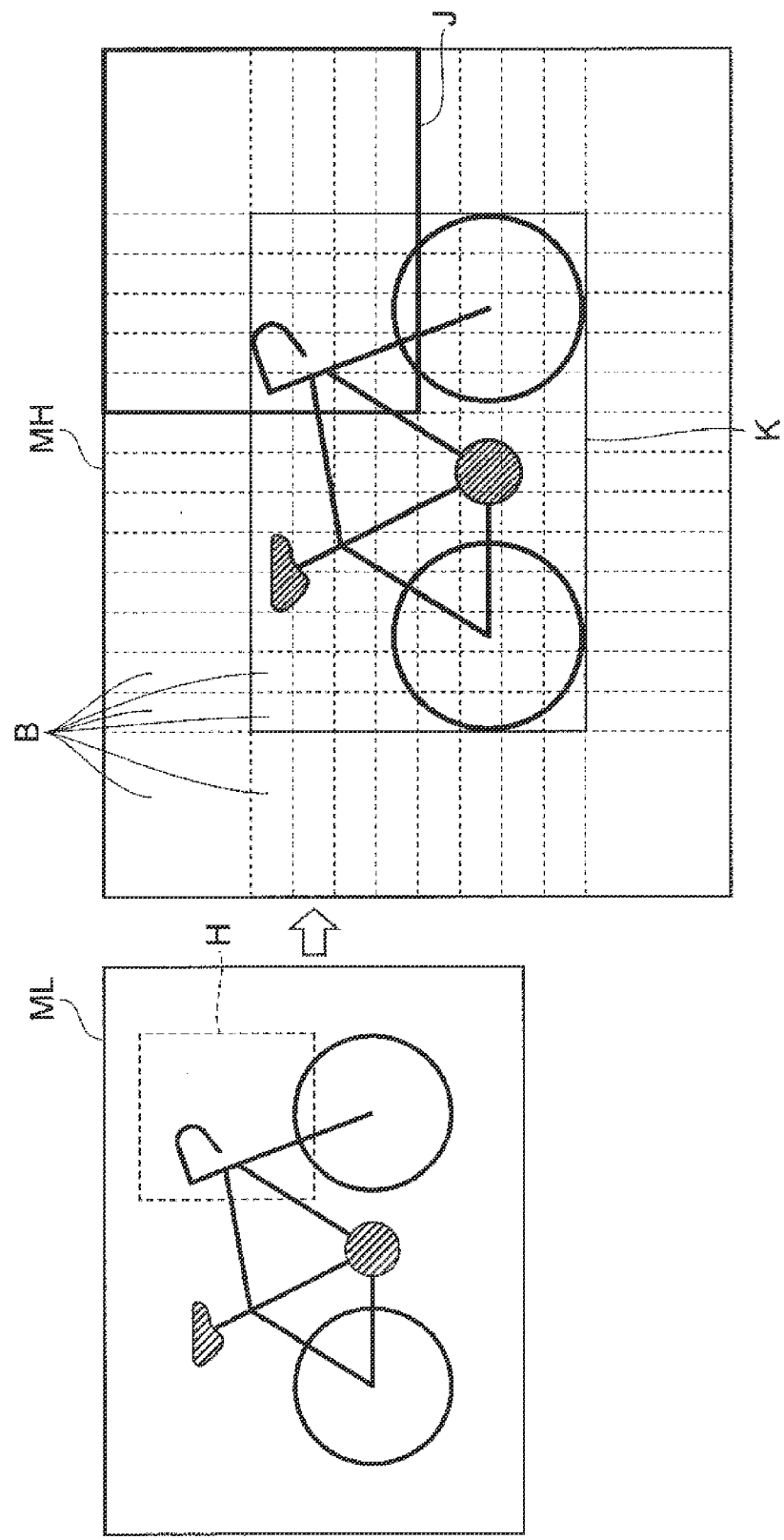
FIG. 9 is a diagram showing another example of specifying a part of a different image.
Figure 10:
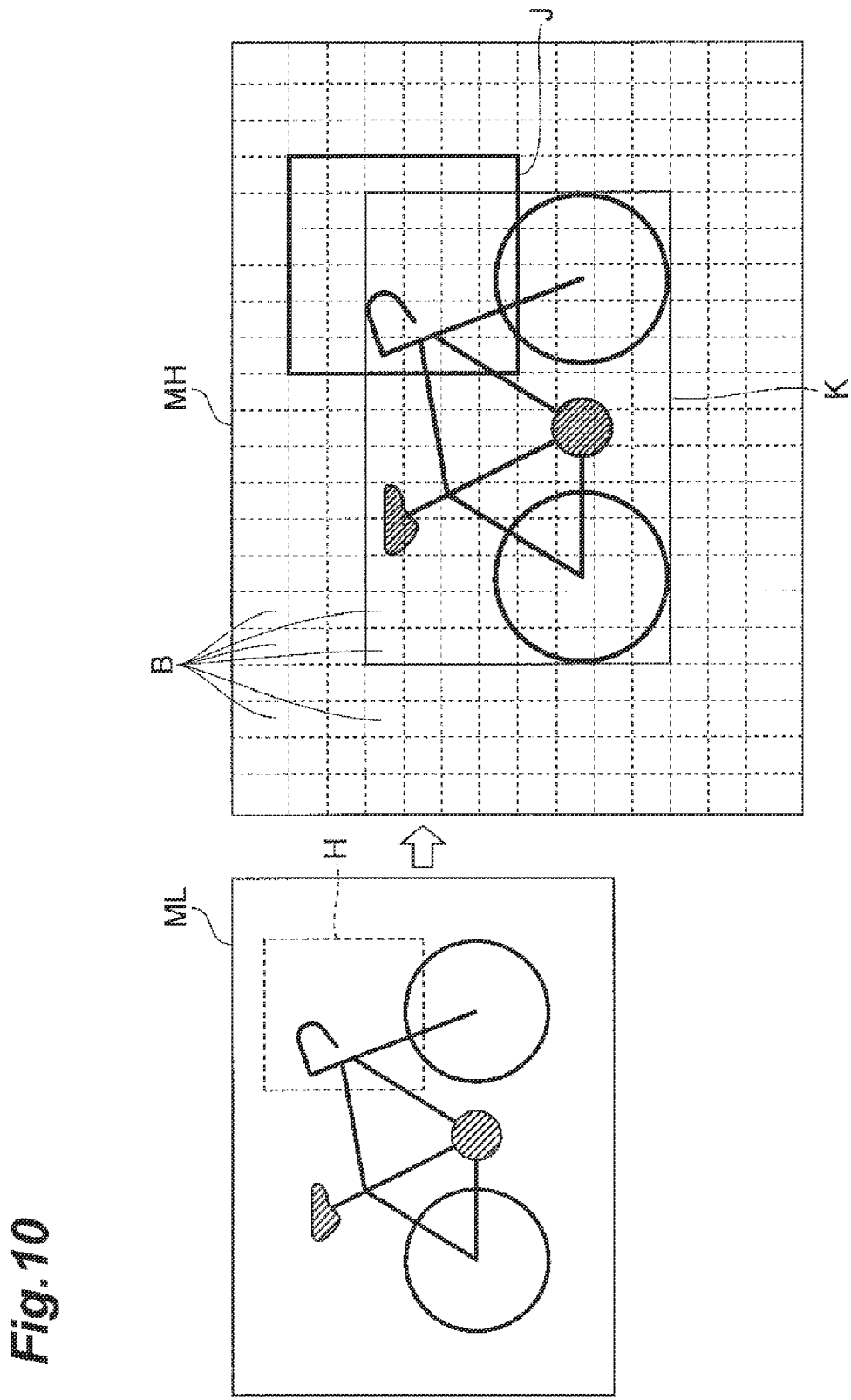
FIG. 10 is a diagram showing another example of specifying a part of a different image.

In the case where the low-resolution image and the high-resolution image indicated by the same image ID are not similar to each other, which is the case where the display position or the size of the object in the frame is different between those images, the specifying unit 13 may specify a part of the different image as shown in FIG. 9 or 10. Specifically, the specifying unit 13 sets a rectangular region K circumscribing the object (bicycle) on the different image MH and equally divides the region K into meshes and further divides the outside of the region K. The outside of the rectangular region K may be divided by extending the segmentation lines in the region K outward as shown in FIG. 9 or by equally dividing the outside region into meshes as shown in FIG. 10. Then, the specifying unit 13 may specify a set of one or more blocks B corresponding to the display range H as a part J of the different image MH. By dividing the outside of the rectangular region K also, the whole of the next image to be displayed can be generated when near the edge of the rectangular region K is zoomed in. In other words, it is possible to deal with zooming in near the edge of the object. In the example of FIG. 10, necessary blocks can be further saved compared with the example of FIG. 9.

If the next image can be generated only with the blocks in the rectangular region K, that is, if the outside of the rectangular region K is not needed, the specifying unit 13 may equally divide only the rectangular region K into meshes. By dividing only the object into a plurality of blocks and generating the next image using the blocks only, it is possible to minimize the load of image processing.

Note that the processing of dividing the different image into meshes may be performed in real time by the specifying unit 13 each time a part of the different image is specified, or may be performed in advance by batch processing and the like. In the case where the specifying unit 13 divides the different image in real time, there is no need to previously include the block information into image data, and it is thereby possible to prepare the different image data easily. On the other hand, if the block information is previously embedded in the different image data, the specifying unit 13 can skip dividing into blocks, and it is thereby possible to specify a part necessary for generation of the next image in a shorter time. In any case, with use of the different image divided into meshes, it is possible to easily specify a part of the different image that is necessary for the next image.

In the case of using meshes, the image data in the image database 30 may be a set of image data representing the image B as each individual block as shown in FIG. 11, rather than one data representing one whole image. FIG. 11(*a*) corresponds to the high-resolution image MH in FIG. 8, and FIG. 11(*b*) corresponds to the high-resolution image MH in FIG. 9.

Note that the low-resolution image may be also stored in the image database 30 as a set of a plurality of image data as shown in FIG. 11. In this manner, when the image is divided and stored, the specifying unit 13 can skip the dividing process and it is thereby possible to specify a part necessary for generation of the next image in a shorter time.

After specifying a part of the different image corresponding to the display range, the specifying unit 13 outputs data indicating the part together with data indicating the different image to the generation unit 14. Note that, although the example of specifying a part of a zoomed-in image is shown in FIGS. 7 to 10 described above, the specifying unit 13 performs the same processing when specifying a part of a zoomed-out image as well.

The generation unit 14 is a functional element that generates a next image representing the part specified by the specifying unit 13 by using different image data. If the different image data represents one whole image, the generation unit 14 generates the next image by cutting a part of the image out or sets the whole image as the next image without modification. If the different image data is a set of image data representing the image of each individual block, the generation unit 14 generates the next image by joining one or a plurality of blocks. No any position information is embedded in the next image. Thus, the next image does not contain information indicating the position of the image or the object and also does not contain information indicating which range or which block of the different image data is used. The generation unit 14 outputs the next image to the image transmitting unit 15.

The image transmitting unit 15 is a functional element that transmits the next image to the user terminal 20. As a result of this transmission, the image displayed on the user terminal 20 is switched into the next image.

Figure 12:
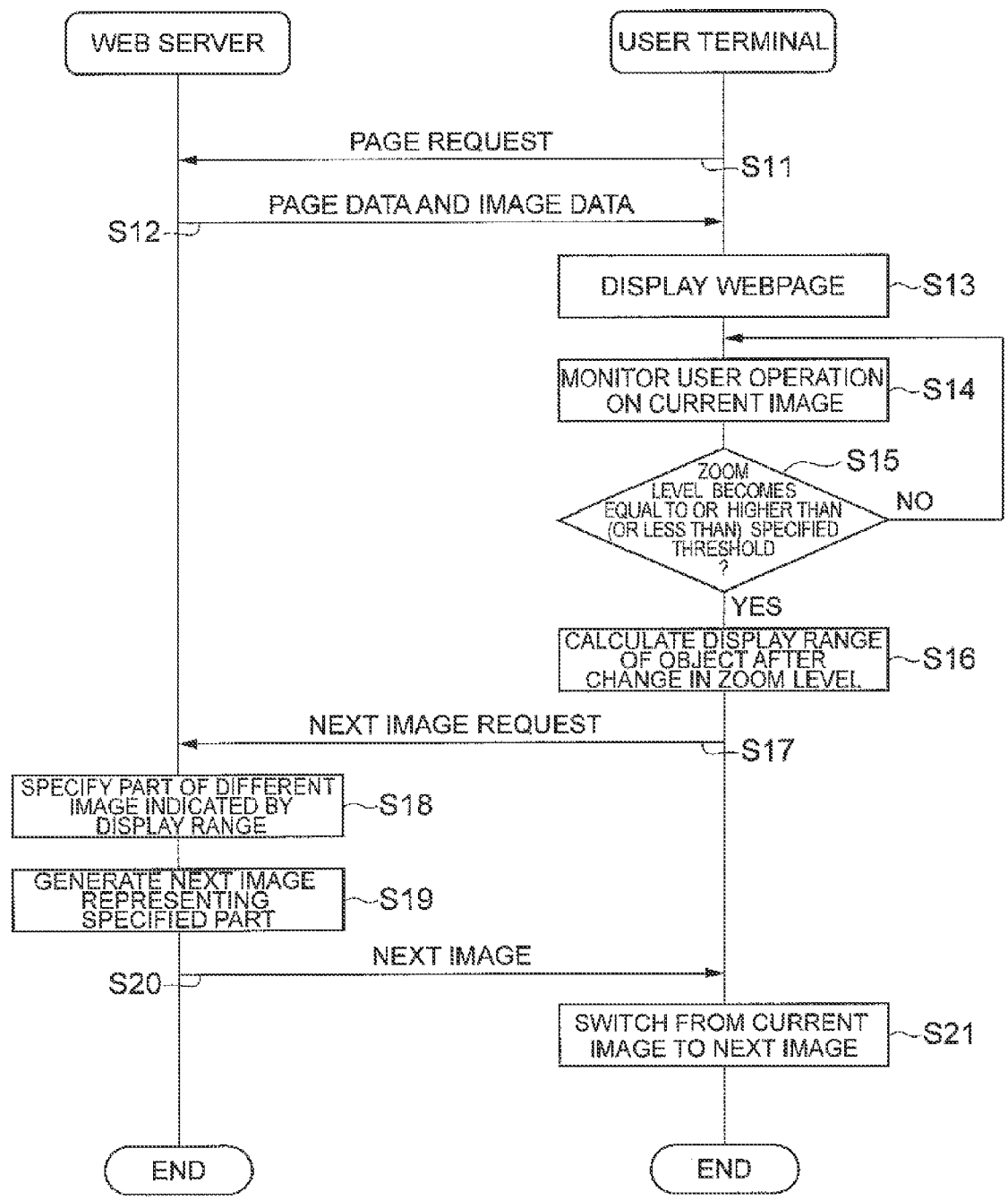
FIG. 12 is a sequence chart showing an operation of an image display system shown in FIG. 1.

The operation of the image display system 1 is described and further an image display method according to this embodiment is described hereinafter with reference to FIG. 12.

When displaying a webpage, the page display unit 21 of the user terminal 20 transmits a page request (Step S11), and the page providing unit 11 of the web server 10 generates a webpage in response to the request, and transmits page data to the user terminal 20 (Step S12). Further, the page providing unit 11 reads image data to be displayed in the page from the image database 30 and transmits it to the user terminal 20 (Step S12). In the user terminal 20, the page display unit 21 displays the webpage using the page data and the image data (Step S13).

After that, in the user terminal 20, the operation monitoring unit 22 monitors a user operation on the current image, which is, to be more specific, an operation of zooming in or out the current image (Step S14). Then, based on operation information on the basis of the monitoring, the calculation unit 23 determines whether the zoom level becomes a specified threshold or higher (or less than a specified threshold) (Step S15). When the zoom level does not reach the threshold, the operation monitoring unit 22 continues to monitor a change in zoom level (NO in Step S15). On the other hand, when the zoom level becomes the threshold or higher (or less than the threshold) (YES in Step S15), the calculation unit 23 calculates the display range of the object of the current image after change in zoom level (Step S16, calculation step), and the request transmitting unit transmits a next image request containing the range information indicating the calculation result to the web server 10 (Step S17).

In the web server 10, the request receiving unit 12 receives the request, and the specifying unit 13 specifies a part of the different image indicated by the calculated display range (Step S18, specifying step). As described above, the specifying unit 13 can perform the specifying process using various methods. Then, the generation unit 14 generates a next image representing the specified part by using the image data of the different image (image data with a different resolution from the current image) (Step S19, generation step), and the image transmitting unit 15 transmits the next image to the user terminal 20 (Step S20, transmitting step). In the user terminal 20, the image receiving unit 25 receives the next image, and the image switching unit 26 switches the currently displayed image into the next image (Step S21). The image with a different resolution from the image that has been displayed is thereby displayed in the image display area of the webpage.

Note that the processing steps S14 to S21 can be executed repeatedly after Step S13.

Figure 13:
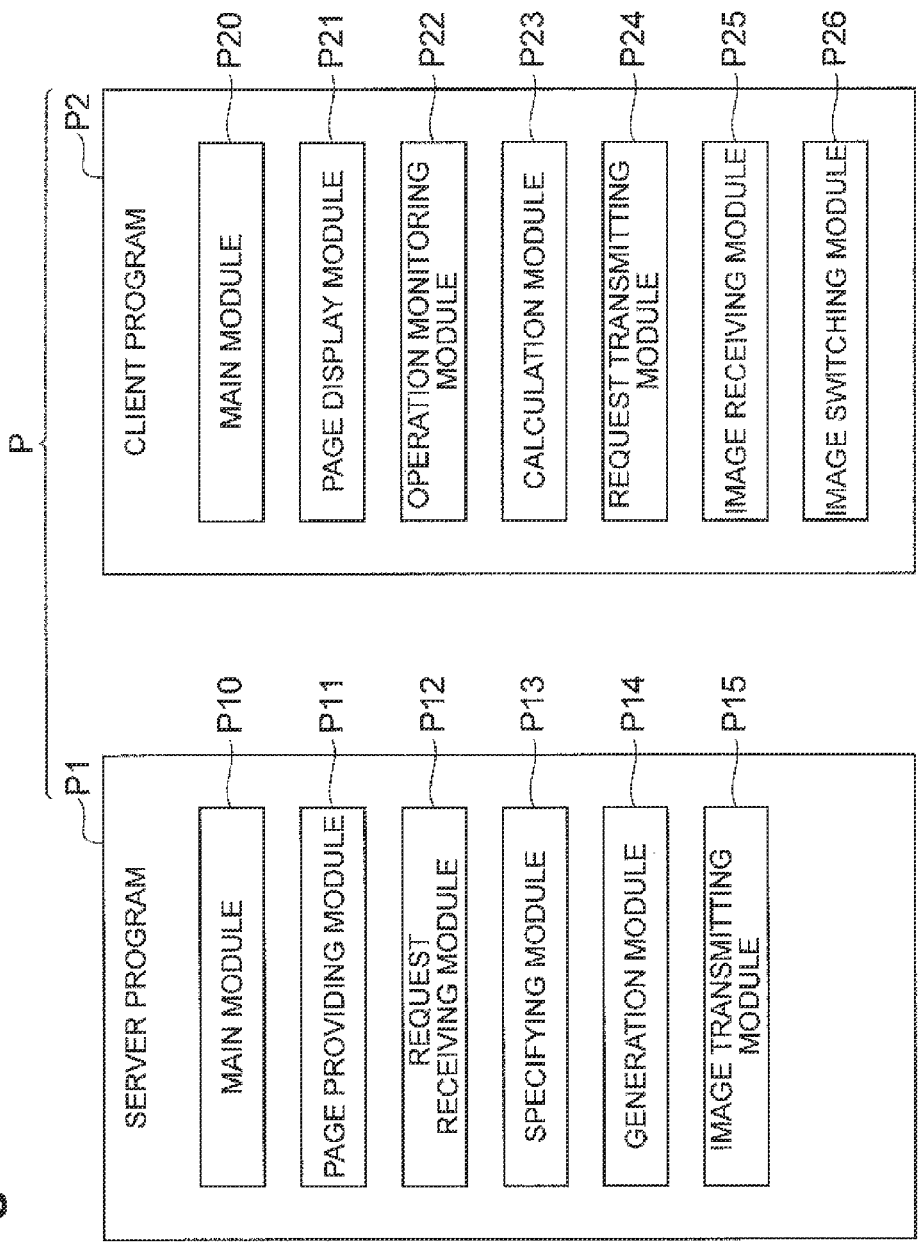
FIG. 13 is a diagram showing a structure of an image display program according to an embodiment.

Hereinafter, an image display program P for implementing the image display system 1 is described with reference to FIG. 13. The image display program P includes a server program P1 that causes a computer to function as the web server 10 and a client program P2 that causes a computer to function as the user terminal 20.

The server program P1 includes a main module P10, a page providing module P11, a request receiving module P12, a specifying module P13, a generation module P14, and an image transmitting module P15.

The main module P10 is a part that exercises control over the image providing function in the web server 10. The functions implemented by executing the page providing module P11, the request receiving module P12, the specifying module P13, the generation module P14 and the image transmitting module P15 are equal to the functions of the page providing unit 11, the request receiving unit 12, the specifying unit 13, the generation unit 14 and the image transmitting unit 15 described above, respectively.

The client program P2 includes a main module P20, a page display module P21, an operation monitoring module P22, a calculation module P23, a request transmitting module P24, an image receiving module P25, and an image switching module P26.

The main module P20 is a part that exercises control over the image display function in the user terminal 20. The functions implemented by executing the page display module P21, the operation monitoring module P22, the calculation module P23, the request transmitting module P24, the image receiving module P25 and the image switching module P26 are equal to the functions of the page display unit 21, the operation monitoring unit 22, the calculation unit 23, the request transmitting unit 24, the image receiving unit 25 and the image switching unit 26 described above, respectively.

The server program P1 and the client program P2 are provided in the form of being recorded in a static manner on a tangible recording medium such as CD-ROM or DVD-ROM or semiconductor memory, for example. Further, each of the programs P1 and P2 may be provided as a data signal superimposed onto a carrier wave through a communication network.

As described above, according to this embodiment, when the zoom level of the current image changes to a specified value, the display range of the object represented by the current image after change is calculated, and a part of a different image required for generation of the next image is specified. Then, the next image is generated from the different image with a different resolution from the current image and transmitted to the user terminal 20, and thereby switching from the current image to the next image is done. In this manner, even when the current image does not have the position information, it is possible to achieve positioning of the current image and the next image (positioning of the images before and after change in zoom level) by calculating the display range after change in zoom level and specifying a part of a different image indicated by the display range.

Because the image is continuously or gradually zoomed in or out, this embodiment is different from switching from a thumbnail image with a low resolution to a detailed image with a high resolution. Further, the current image and the next image displayed on the user terminal 20 do not have the position information of an object (subject) and therefore this embodiment is also different from the technique of the above-described Non Patent Literature 1 that performs processing based on the position information embedded in the image.

In the above-described embodiment, because the display range is calculated in the user terminal 20, there is no need for the web server 10 to perform the calculation, and it is therefore possible to reduce the processing in the web server 10. Further, since the next image request from the user terminal 20 is transmitted to the web server 10 only after an operation to change the zoom level of the current image to a specified value is performed, it is possible to reduce the communication load.

Embodiments of the present invention are described in detail above. However, the present invention is not limited to the above-described embodiments. Various changes and modifications may be made to the present invention without departing from the scope of the invention.

The calculation unit 23 may calculate the display range indicated by the level of the threshold at the timing before the zoom level reaches the threshold to require switching of the resolution and output the range information to the request transmitting unit 24. In this case, the calculation unit 23 uses a threshold for start of calculation (calculation start threshold), which is different from a threshold for switching the resolution (switching threshold). For example, assuming that the zoom level is managed as a relative value, if the switching threshold (specified value) when zooming in the image is 1.5(×), the calculation start threshold (reference value) may be set to 1.3(×), and if the switching threshold (specified value) when zooming out the image is 0.5(×), the calculation start threshold (reference value) may be set to 0.7(×). The calculation unit 23 calculates the display range indicated by the level of the switching threshold only when the obtained zoom level reaches the calculation start threshold, and outputs the range information indicating this range to the request transmitting unit 24.

In this case, assuming that a user operation to zoom in or out the image continues, the request transmitting unit 24 of the user terminal 20 transmits the next image request to the web server 10 prior to the timing when the switching of the resolution of the image is required. Accordingly, the processing in the web server 10 starts earlier, and the user terminal 20 can thereby acquire the next image earlier. As a result, it is possible to perform switching from the current image to the next image in a more seamless manner.

In the above-described alternative example using the switching threshold and the calculation start threshold, when the zoom level changes to the switching threshold without going through the calculation start threshold, the calculation unit 23 may calculate the display range in response to the event that the zoom level changes to the switching threshold, just like in the above-described embodiment. For example, in the case where both of a user interface allowing continuously changing the zoom level (for example, a touch panel, a slider etc.) and a user interface allowing directly entering the zoom level (for example, a text box) are provided, the calculation unit 23 calculates the display range at the timing corresponding to each interface. Therefore, when the same value as the switching threshold is entered in the text box, for example, and therefore the zoom level changes to the switching threshold without going through the calculation start threshold, it is possible to calculate the display range after change and transmit the next image to the user terminal 20.

Although two images, a low-resolution image and a high-resolution image, are prepared as images related to one object in the above embodiment, three or more images with different resolutions may be prepared for one object. In this case, the number of thresholds to switch the resolution is determined according to the number of images for one object. For example, when three images E, F and G with resolutions of Re, Rf and Rg (where Re<Rf<Rg) are prepared for one object, a threshold related to switching between the image E and the image F and a threshold related to switching between the image F and the image G are prepared.

The processing of calculating the display range may be performed in the web server 10, instead of the user terminal 20. Specifically, the web server 10, not the user terminal 20, may include the calculation unit. In this case, the request transmitting unit 24 transmits operation information input from the operation monitoring unit 22 to the web server 10. In the web server 10, the request receiving unit 12 receives the operation information, and the calculation unit performs the same processing as in the above embodiment based on the information, and the specifying unit 13 performs the subsequent processing. In this case, the user terminal 20 does not need to calculate the display range, and the processing in the user terminal 20 can be reduced.

Although the present invention is applied to the image display system 1 including the web server 10 in the above-described embodiment, the application of the present invention is not limited to the case of providing a webpage containing an image. The present invention is applicable to any image processing where the zoom level of an image can be changed based on a user operation.

REFERENCE SIGNS LIST

1 . . . image display system, 10 . . . web server, 11 . . . page providing unit, 12 . . . request receiving unit, 13 . . . specifying unit, 14 . . . generation unit, 15 . . . image transmitting unit, 20 . . . user terminal, 21 . . . page display unit, 22 . . . operation monitoring unit, 23 . . . calculation unit, 24 . . . request transmitting unit, 25 . . . image receiving unit, 26 . . . image switching unit, 30 . . . image database, P . . . image display program, P1 . . . server program, P10 . . . main module, P11 . . . page providing module, P12 . . . request receiving module, P13 . . . specifying module, P14 . . . generation module, P15 . . . image transmitting module, P2 . . . client program, P20 . . . main module, P21 . . . page display module, P22 . . . operation monitoring module, P23 . . . calculation module, P24 . . . request transmitting module, P25 . . . image receiving module, P26 . . . image switching module

The invention claimed is:

1. An image display system comprising:
at least one memory operable to store program code;
at least one processor operable to access said memory and read said program code and operate as instructed by said program code, said program code including:
calculation code configured to cause at least one of said at least one processor to, when a zoom level of a current image not containing position information of an object reaches a first threshold on a user terminal, divide the current image into meshes and then, calculate a display range of the object represented by the current image after change in zoom level by specifying blocks of the current image constituting the display range;

specifying code configured to cause at least one of said at least one processor to refer to data of a different image of the object from a storage unit, the different image being divided into meshes and having a different resolution from the current image, and specify a part of the different image indicated by blocks of the different image corresponding to the blocks constituting the calculated display range;

generation code configured to cause at least one of said at least one processor to generate a next image representing the specified part based on the blocks constituting the part of the different image; and transmitting code configured to cause at least one of said at least one processor to transmit the next image to the user terminal for switching from the current image to the next image, wherein when the zoom level of the current image reaches a second threshold different from the first threshold before reaching the first threshold, the calculation code is further configured to cause at least one of said at least one processor to, before the zoom level of the current image reaches the first threshold, start calculating the display range of a case where the zoom level of the current image reaches the first threshold, and when the zoom level of the current image reaches the first threshold without going through the second threshold, the calculation code is further configured to cause at least one of said at least one processor to calculate the display range of the object represented by the current image after change in zoom level in response to change of the zoom level to the first threshold.

2. The image display system according to claim 1, wherein the specifying code is further configured to cause at least one of said at least one processor to specify one or more blocks corresponding to the calculated display range from the different image divided into a plurality of mesh-like blocks as a part of the different image.

3. The image display system according to claim 2, wherein the plurality of blocks are formed by equally dividing a whole of the different image.

4. The image display system according to claim 2, wherein the plurality of blocks are formed by equally dividing a rectangular region circumscribing the object.

5. The image display system according to claim 4, wherein the plurality of blocks are formed by equally dividing the rectangular region and dividing an outside of the rectangular region.

6. The image display system according to claim 2, wherein the specifying code is further configured to cause at least one of said at least one processor to divide the different image into the plurality of mesh-like blocks each time the display range is calculated.

7. The image display system according to claim 2, wherein block information identifying the plurality of blocks is contained in advance in the data of the different image, and the specifying code is further configured to cause a least one of said at least one processor to specify a part of the different image by referring to the block information.

8. The image display system according to claim 7, wherein the data of the different image is a set of data of the individual blocks, and the generation code is further configured to cause at least one of said at least one processor to generate the next image by joining the blocks corresponding to the specified part.

9. The image display system according to claim 1, wherein the calculation code is further configured to cause at least one of said at least one processor to specify a center point of change of the zoom level and calculate the display range based on the center point and the zoom level.

10. The image display system according to claim 1, wherein the image display system includes a server configured to communicate with the user terminal, and the calculation code is further configured to cause at least one of said at least one processor to transmit range information indicating the display range to the server.

11. The image display system according to claim 1, wherein the image display system includes a server configured to communicate with the user terminal, the user terminal provides operation information indicating a user operation related to change in zoom level to the server, and the calculation code is further configured to cause at least one of said at least one processor to calculate the display range based on the operation information.

12. An image display method executed in an image display system, including at least one processor, comprising:

dividing, using at least one of said at least one processor, when a zoom level of a current image not containing position information of an object reaches a first threshold on a user terminal, the current image into meshes and then, calculating a display range of the object represented by the current image after change in zoom level by specifying blocks of the current image constituting the display range;

referring, using at least one of said at least one processor, to data of a different image of the object from a storage, the different image being divided into meshes and having a different resolution from the current image, and specifying, using at least one of said at least one processor, a part of the different image indicated by blocks of the different image corresponding to the blocks constituting the display range calculated in the calculation step;

generating, using at least one of said at least one processor, a next image representing the part specified in the specifying step based on the blocks constituting the part of the different image; and transmitting, using at least one of said at least one processor, the next image to the user terminal for switching from the current image to the next image, wherein when the zoom level of the current image reaches a second threshold different from the first threshold before reaching the first threshold, the calculating further comprises, before the zoom level of the current image reaches the first threshold, starting calculating the display range of a case where the zoom level of the current image reaches the first threshold, and when the zoom level of the current image reaches the first threshold without going through the second threshold, the calculating further comprises calculating the display range of the object represented by the current image after change in zoom level in response to change of the zoom level to the first threshold.

13. A non-transitory computer-readable recording medium storing an image display program causing a computer, including at least one processor, to:

when a zoom level of a current image not containing position information of an object reaches a first threshold on a user terminal, divide the current image into meshes and then, calculate a display range of the object represented by the current image after change in zoom level by specifying blocks of the current image constituting the display range;

refer to data of a different image of the object from a storage, the different image being divided into meshes and having a different resolution from the current image, and specify a part of the different image indicated by blocks of the different image corresponding to the blocks constituting the calculated display range;

generate a next image representing the specified part based on the blocks constituting the part of the different image; and transmit the next image to the user terminal for switching from the current image to the next image, wherein when the zoom level of the current image reaches a second threshold different from the first threshold before reaching the first threshold, the image display program further causes the computer to, before the zoom level of the current image reaches the first threshold, start calculating the display range of a case where the zoom level of the current image reaches the first threshold, and when the zoom level of the current image reaches the first threshold without going through the second threshold, the image display program further causes the computer to calculate the display range of the object represented by the current image after change in zoom level in response to change of the zoom level to the first threshold.

* * * * *